(12) United States Patent
Shoshan et al.

(10) Patent No.: US 12,475,193 B1
(45) Date of Patent: Nov. 18, 2025

(54) SYSTEM TO REDUCE DATA RETENTION USING AGGREGATED EMBEDDING DATA

(71) Applicant: AMAZON TECHNOLOGIES, INC., Seattle, WA (US)

(72) Inventors: Alon Shoshan, Haifa (IL); Igor Kviatkovsky, Haifa (IL); Nadav Israel Bhonker, Talmei Elazar (IL); Lior Zamir, Ramat Hasharon (IL); Gerard Guy Medioni, Los Angeles, CA (US); Manoj Aggarwal, Seattle, WA (US); Dilip Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 643 days.

(21) Appl. No.: 17/456,055

(22) Filed: Nov. 22, 2021

Related U.S. Application Data

(63) Continuation-in-part of application No. 17/448,437, filed on Sep. 22, 2021, now Pat. No. 12,086,225.

(51) Int. Cl.
*G06F 18/2137* (2023.01)
*G06F 18/214* (2023.01)
(Continued)

(52) U.S. Cl.
CPC ...... *G06F 18/21375* (2023.01); *G06F 18/214* (2023.01); *G06N 3/045* (2023.01);
(Continued)

(58) Field of Classification Search
CPC ............ G06F 18/21375; G06F 18/214; G06F 2218/00; G06F 2218/14; G06N 3/045; G06V 40/10; G06V 40/53
See application file for complete search history.

(56) References Cited

U.S. PATENT DOCUMENTS

2019/0251684 A1* 8/2019 Ko ............................ G06T 5/73
2019/0278985 A1* 9/2019 Liu ........................ G06V 40/70
(Continued)

OTHER PUBLICATIONS

Yang, et al., "Neural Aggregation Network for Video Face Recognition", Microsoft Research, The Australian National University, and Beijing Institute of Technology, Aug. 2, 2017, 10 pgs. Retrieved from the Internet: https://arxiv.org/pdf/1603.05474.pdf.
(Continued)

*Primary Examiner* — Huan V Doan
(74) *Attorney, Agent, or Firm* — Lindauer Law, PLLC

(57) ABSTRACT

An image of at least a portion of a user during enrollment to a biometric identification system is acquired and processed with a plurality of models to determine embeddings that are representative of features in that image in respective embedding spaces. Transformers are trained to accept as input an embedding from a respective model and produce as output a transformed embedding consistent with a common embedding space. These transformed embeddings are aggregated to produce transformed aggregated embedding data and stored for later comparison to identify the user. Subsequently, one or more embedding models may be used to process a query image to determine a query embedding. The query embedding may be transformed into the common embedding space for comparison.

20 Claims, 10 Drawing Sheets

(51) Int. Cl.
  *G06N 3/045* (2023.01)
  *G06V 40/10* (2022.01)
  *G06V 40/50* (2022.01)

(52) U.S. Cl.
  CPC .......... *G06V 40/10* (2022.01); *G06F 2218/00* (2023.01); *G06F 2218/14* (2023.01); *G06V 40/53* (2022.01)

(56) References Cited

U.S. PATENT DOCUMENTS

| | | | |
|---|---|---|---|
| 2020/0184171 A1* | 6/2020 | Lee | G06V 40/1376 |
| 2020/0184278 A1 | 6/2020 | Zadeh et al. | |
| 2020/0302152 A1 | 9/2020 | Tagra et al. | |
| 2021/0117721 A1* | 4/2021 | Hall | G06V 40/1376 |
| 2021/0279515 A1 | 9/2021 | Zhang et al. | |
| 2022/0277588 A1 | 9/2022 | Zhai | |
| 2022/0327189 A1 | 10/2022 | Belli et al. | |
| 2023/0094896 A1* | 3/2023 | Hayashi | G06T 7/70 382/118 |

OTHER PUBLICATIONS

Doan,Huan V., "Non-final Office Action dated Oct. 26, 2023", U.S. Appl. No. 17/448,437, The United States Patent and Trademark Office, Oct. 26, 2023.

* cited by examiner

SYSTEM TO REDUCE DATA RETENTION USING AGGREGATED EMBEDDING DATA

PRIORITY

This application is a continuation in part of, and claims priority to, U.S. patent application Ser. No. 17/448,437, filed on Sep. 22, 2021, entitled "System to Reduce Data Retention", which is hereby incorporated by reference in its entirety.

BACKGROUND

Biometric input data may be used to assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
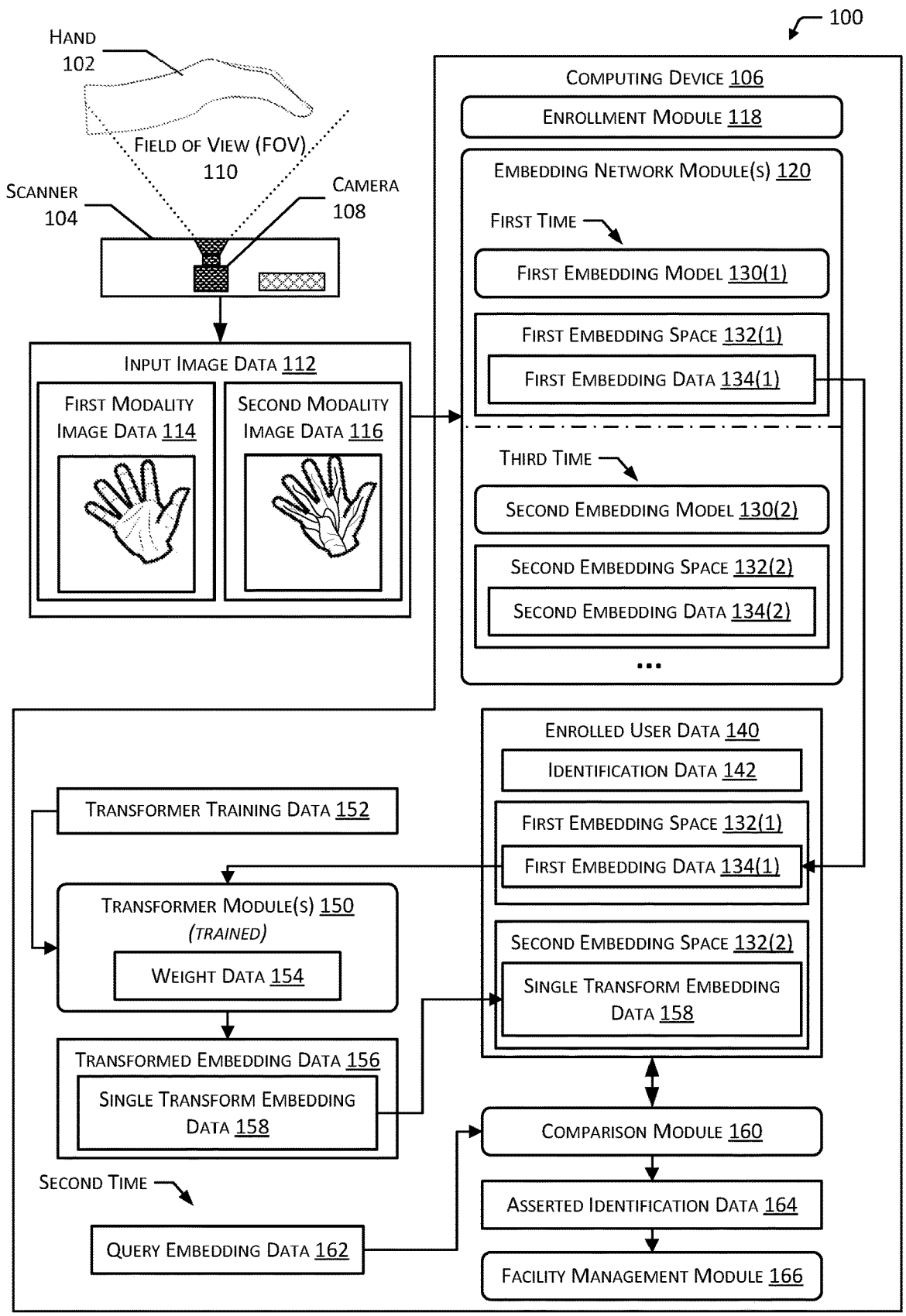
FIG. 1 illustrates a system to reduce data retention in a biometric identification system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data, such as used for biometric identification, may be acquired using one or more modalities. For example, a first modality may comprise images of surface skin of a user's palm while a second modality may comprise images of subcutaneous features such as veins of the user's palm. The use of multi-modality input data provides several advantages for biometric identification.

Traditional biometric identification systems obtain input data during enrollment and store this input data as a "gallery". This gallery facilitates further development and refinement of the traditional identification system. Development may include updates to algorithms used to characterize the input data. For example, a first neural network may be trained to process an input image and generate a first embedding that comprises a vector value representative of the features depicted in that input image. Later, a second neural network may be trained to generate a second embedding that may be deemed advantageous to use going forward. In such systems, the input images in the gallery are processed with the second neural network to generate the second embeddings.

Because the gallery contains information that may be deemed to be private by users, legal entities, and so forth, the information therein must be safeguarded from impermissible access. As a result, substantial efforts are taken in an attempt to prevent disclosure of information in the gallery.

One inadequate option is to retain only the first embeddings, and not store gallery data. However, this approach requires user input if an update changes the embedding. For example, without the gallery data, to generate the second embeddings each user of the system would need to perform the enrollment process again. Such repeated efforts may annoy users, limit improvement of the identification system, substantially increase costs associated with an update, and so forth.

Described in this disclosure are techniques to reduce or eliminate altogether retention of input data for a biometric identification system by using aggregated embedding data. The aggregated embedding data provides enhanced information, improving subsequent operation during recognition. The gallery is eliminated, removing privacy and security concerns. Future updates to the biometric identification system are possible without re-enrollment by training transformer networks to convert a first embedding to a second embedding and without reducing system accuracy. These techniques may also be used to migrate information about users from one biometric identification platform to another.

The transformer networks are neural networks that are trained using training data. The training data uses a training image that is processed by a first embedding model to determine first training embedding data, representative of the training image in a first embedding space. The training image is also processed by a second embedding model to determine second training embedding data, representative of the same training image in a second embedding space. Transformer training data comprises pairs of first training embedding data and second training embedding data that are associated with the same training image. The training images themselves may be actual images obtained from individuals who have opted in to provide training data, synthetic images that are produced such as by a generative adversarial network, and so forth.

The use of the trained transformer networks also allows the use of embedding models by the system that may otherwise be unavailable. For example, another system, or portion of the system described herein, may contain other training data that is proprietary, confidential, or otherwise is unavailable for external use. The other system may use that other training data to train an embedding model. The trained embedding model may then be used by the system described in this disclosure. As a result, the system is able to benefit from embedding models that are trained using training data that would otherwise be unavailable.

The transformer network is trained using the transformer training data and using several loss values. A transformer network module processes the first training embedding data to determine transformed embedding data. While the network is learning, this transformed embedding data may be a poor representation, but as a result of repeated iterations during training and using the loss functions described, the transformer network module learns to transform or convert the first embedding data into second embedding data. During training, for each pair of transformer training data, a first classification loss is determined based on the transformed embedding data. A second classification loss is also determined, based on the second training embedding data. A similarity loss based on the transformed embedding data and the second training embedding data is then determined. A divergence loss based on the first classification loss and the second classification loss is also determined. These loss values are then provided back to the transformer network module during training.

The trained transformer network(s) may be used in various implementations. In a first implementation, a single transformer network is used to transform first embedding data that is associated with a first embedding space into single transform embedding data that is associated with a second embedding space. For example, if an embedding model of a biometric identification system is updated from a first model to a second model, operation of the system may continue without a gallery or requiring re-enrollment. The "old" single first embeddings are converted to the "new" single second embeddings by the trained single transformer network.

In a second implementation, a plurality of different transformer networks may be used, each trained as described above. Each of these transformer networks, as a result of training, will have different weights for nodes in the respective neural networks. To perform the transform, the first embedding data is provided as input to each of the plurality of different transformer networks. Each in turn produces single transform embedding data. For example, the transformed embedding data may comprise a vector value. A set of the single transform embedding data from the plurality may be aggregated to produce aggregated embedding data, in particular monomodel embedding data that is expressed in the second embedding space. For example, the vector values of two or more single transform embedding data may be averaged to produce aggregated embedding data. Colloquially, this implementation may be considered as though each transformer network has "learned" differently from other transformer networks and contributes to the aggregated embedding data.

In a third implementation, a plurality of different transformer networks are each trained for different pairwise combinations of embeddings from different embedding models. For example, over time the first model may be replaced with a second model, the second model replaced with a third model, and so forth. Corresponding embedding data may be available that was generated using these respective models, such as first embedding data, second embedding data, and third embedding data. A plurality of transformer networks may be used, each trained as above for a different pairwise combination of embeddings. For example, a first transformer network may be trained to transform a first embedding to a fourth embedding. A second transformer network may be trained to transform a second embedding to the fourth embedding. A third transformer network may be trained to transform a third embedding to the fourth embedding.

With this third implementation, the respective embeddings that are associated with the same identity are transformed into single transform embedding data in the fourth embedding space and aggregated to determine aggregated embedding data. As above, the transformed embedding data may comprise a vector value. A set of the single transform embedding data from the plurality may be combined to produce aggregated embedding data that is representative of the second embedding space. For example, the vector values may be averaged to produce aggregated embedding data, in particular multimodel embedding data. Colloquially, this implementation may be considered as though each of the different embeddings for the same identity have contributed some information to the aggregated embedding data.

In other implementations, other combinations of these techniques may be used. For example, the second and third implementations may be combined to produce aggregated embedding data in which monomodel embedding data obtained using a plurality of models is aggregated.

By using the techniques described in this disclosure, a biometric identification system is able to operate and be updated without storing a gallery, such as images of a user's hands. Furthermore, by using the techniques described herein, operation without the retention of a gallery is possible with the same or greater accuracy compared to systems that maintain a gallery. This affords a substantial increase in user privacy by eliminating the possibility of inadvertent release of gallery data, while maintaining a high level of accuracy in operation of the system. For example, by using the techniques used in this disclosure user privacy is improved by not storing gallery data, while the user experience and overall system integrity is improved by maintaining subsequent highly accurate identification. This also results in a substantial decrease in data storage requirements by eliminating the need to store gallery data.

The techniques also improve accurate identification of users. The aggregated embedding data comprises richer information about the biometric features than a single embedding. A plurality of embedding models may be used during enrollment to determine the embedding data that is then aggregated as described herein to determine the aggregated embedding data that is then associated with a particular identity. The trained transformer network(s) and the aggregated embedding data based on the output from those trained transformer network(s) may be trained such that the aggregated embedding data is in the embedding space associated with a query embedding model.

During processing of a query image to determine identity, a query embedding model is used to determine query embedding data. The query embedding model used to determine the query embedding data may be different from the plurality of embedding models used during enrollment. The query embedding data is represented in the same embedding space as the aggregated embedding data. As a result, a comparison may be made between the query embedding data and the aggregated embedding data associated with previously enrolled users. Based on the comparison, an identity of a previously enrolled user may be asserted.

Illustrative System

FIG. 1 illustrates a system 100 to reduce data retention, according to some implementations. The system 100 is described as being used to facilitate the reduction of data retained as part of a biometric identification system that determines an identity of a user. However, the system and techniques described herein may be used in other situations.

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation, the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the scanner 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame.

In the implementation depicted here, the scanner 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image.

Users are able to utilize the system 100 by performing an enrollment process. An enrollment module 118 may coordinate the enrollment process. Enrollment may associate biometric information, such as embedding data or transformed embedding data, with particular information such as a name, account number, and so forth.

During an enrollment process, the user opts in and presents their hand 102 to the scanner 104. The scanner 104 provides input image data 112 to a computing device 106 executing an embedding network module 120. The embedding network module 120 comprises a neural network implementing at least one embedding model 130 that accepts as input the input image data 112 and provides as output embedding data 134. The embedding data 134 is representative of at least some of the features depicted in the input image data 112. In some implementations the embedding data 134 may comprise a vector value in an embedding space.

In some implementations, the scanner 104 may include a computing device 106, and may execute the embedding network module(s) 120. In another implementation, the scanner 104 may encrypt and send the input image data 112 or data based thereon, to another computing device 106 such as a server.

During the enrollment process, the submitted embedding data 134 may be checked to determine whether the user has been previously enrolled. A successful enrollment may comprise storage of identification data 142, such as name, telephone number, account number, and so forth and storage of one or more of the embedding data 134 or the transformed embedding data 156 as enrolled user data 140. In some implementations, the enrolled user data 140 may comprise additional information associated with processing of the input image data 112 with an embedding model 130. For example, the enrolled user data 140 may comprise intermediate layer data, such as the values of a penultimate layer of the embedding model 130.

FIG. 1 illustrates the use of single transform embedding data 158. Aggregated embedding data based on a plurality of single transform embedding data 158 is discussed in more detail in the following disclosure, beginning at FIG. 5A. In this illustration, at a first time, at the time of enrollment a first embedding model 130(1) is in use by the embedding network modules 120. The first embedding model 130(1) has been trained to accept input image data 112, operates within a first embedding space 132(1), and generates as output first embedding data 134(1). The first embedding data 134(1) consists of a vector value that is within the first embedding space 132(1). The first embedding space 132(1) may have a first dimensionality. For example, a vector within the first embedding space 132(1) may be associated with 512 dimensions.

Continuing at the first time, the first embedding data 134(1) from our user's enrollment may then be stored as the enrolled user data 140. Also stored is identification data 142 that is associated with this first embedding data 134(1). However, it is important to note that the input image data 112 acquired during enrollment is not stored as enrolled user data 140. In other words, no "gallery" of input images is retained. In this example, at the first time, only the first embedding data 134(1) and the associated identification data 142 are stored as enrolled user data 140.

During subsequent usage, such as at a second time, the (as yet unidentified) user presents their hand 102 at a scanner 104. The resulting query input image data 112 may be processed by the first embedding model 130(1) to determine query embedding data 162 that is in the first embedding space 132(1). The comparison module 160 compares the query embedding data 162 to the first embedding data 134(1) stored in the enrolled user data 140 to determine asserted identification data 164. In one implementation, the asserted identification data 164 may comprise a user identifier associated with the closest previously stored embedding data 134 in the enrolled user data 140 to the query embedding data 162 associated with the user who presented their hand 102. The comparison module 160 may utilize other considerations, such as requiring that the query embedding data 162 is no more than a maximum distance in the embedding space from the embedding data 134 of a particular user before determining the asserted identification data 164.

In other implementations described herein, aggregated embedding data may be determined during enrollment. The query embedding data 162 and the aggregated embedding data may be provided as input to the comparison module 160 to determine the asserted identification data 164.

The asserted identification data 164 may then be used by subsequent systems or modules. For example, the asserted identification data 164, or information based thereon, may be provided to a facility management module 166.

The facility management module 166 may use the asserted identification data 164 to associate an identity with that user as they move about the facility. For example, the facility management module 166 may use data from cameras or other sensors in the environment to determine a location of the user. Given a known path of the user from an entrance that utilizes the scanner 104, the user identity indicated in the identification data 142 may be associated with the user as they use the facility. For example, the now identified user may walk to a shelf, remove an item, and leave the facility. The facility management module 166 may determine the interaction data indicative of the removal of the item as being associated with the user identifier specified in the asserted identification data 164, and bill an account associated with the user identifier. In another implementation, the facility management module 166 may comprise a point of sale system. The user may present their hand 102 at checkout to assert their identity and pay using a payment account that is associated with their identity.

The system 100 may continue to undergo changes over time. In this illustration, at a third time the embedding network modules 120 are updated to include a second embedding model 130(2). For example, the second embedding model 130(2) may comprise a different neural network architecture, may have used different training data, and so forth.

This second embedding model 130(2) generates second embedding data 134(2) that is within a second embedding space 132(2). The second embedding space 132(2) may differ from the first embedding space 132(1). For example, the second embedding space 132(2) may have a different number of dimensions from the first embedding space 132(1). In another example, the first embedding space 132(1) and the second embedding space 132(2) may have the same overall dimensionality, but one or more specified dimensions in the first embedding space 132(1) are not collinear with one or more specified dimensions in the second embedding space 132(2). In some implementations embedding spaces 132 may share one or more common dimensions, or may be completely disjoint.

The differences between the first embedding data 134(1) in the first embedding space 132(1) and the second embedding data 134(2) in the second embedding space 132(2) make them incompatible for direct comparison by the comparison module 160 without further processing.

With no further processing or action, for the system to continue to operate, it would be necessary to perform the enrollment process again, processing the input image data 112 with the second embedding model 130(2) in order to determine the second embedding data 134(2) for retention in the enrolled user data 140. However, this is annoying to users, time intensive, and costly. Each time an embedding model 130 is changed to utilize a different embedding space 132, such action would need to be taken. As a result, development may be stifled.

A transformer module 150 is trained using transformer training data 152 to transform or convert embedding data 134 from one embedding space 132 to another. Once trained, the transformer module 150 includes weight data 154 that is indicative of weights, bias values, or other values associated with nodes in its neural network that are representative of the resulting training. The training and operation of the transformer module 150 is discussed in more detail in the following figures.

Once trained, the transformer module(s) 150 is used to transform embedding data 134 into transformed embedding data 156. The transformed embedding data 156 may include one or more of single transform embedding data 158 or aggregated embedding data as described herein. For example, a transformer module 150 may transform the first embedding data 134(1) into the second embedding data 134(2). As a result, during subsequent use the second embedding model 130(2) may be used, and the comparison module 160 is able to operate by comparing query embedding data 162 in the second embedding space 132(2) with enrolled user data 140 comprising the transformed embedding data 156.

In another implementation, a plurality of single transform embedding data 158 may be processed to determine aggregated embedding data. The aggregated embedding data may then be stored as enrolled user data 140 and used for subsequent processing by the comparison module 160.

By using the system and techniques described in this disclosure, gallery data comprising input image data 112 acquired during enrollment is not retained. This improves overall privacy for the user, reduces a quantity of data that has to be securely stored, and still allows for ongoing updates to the embedding network modules 120.

In implementations using the aggregated embedding data, the enrolled user data 140 may comprise the identification data 142 and associated aggregated embedding data, with individual embedding data 134 and single transform embedding data 158 omitted. This may reduce the overall size of the enrolled user data 140, facilitating storage.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

Figure 2:
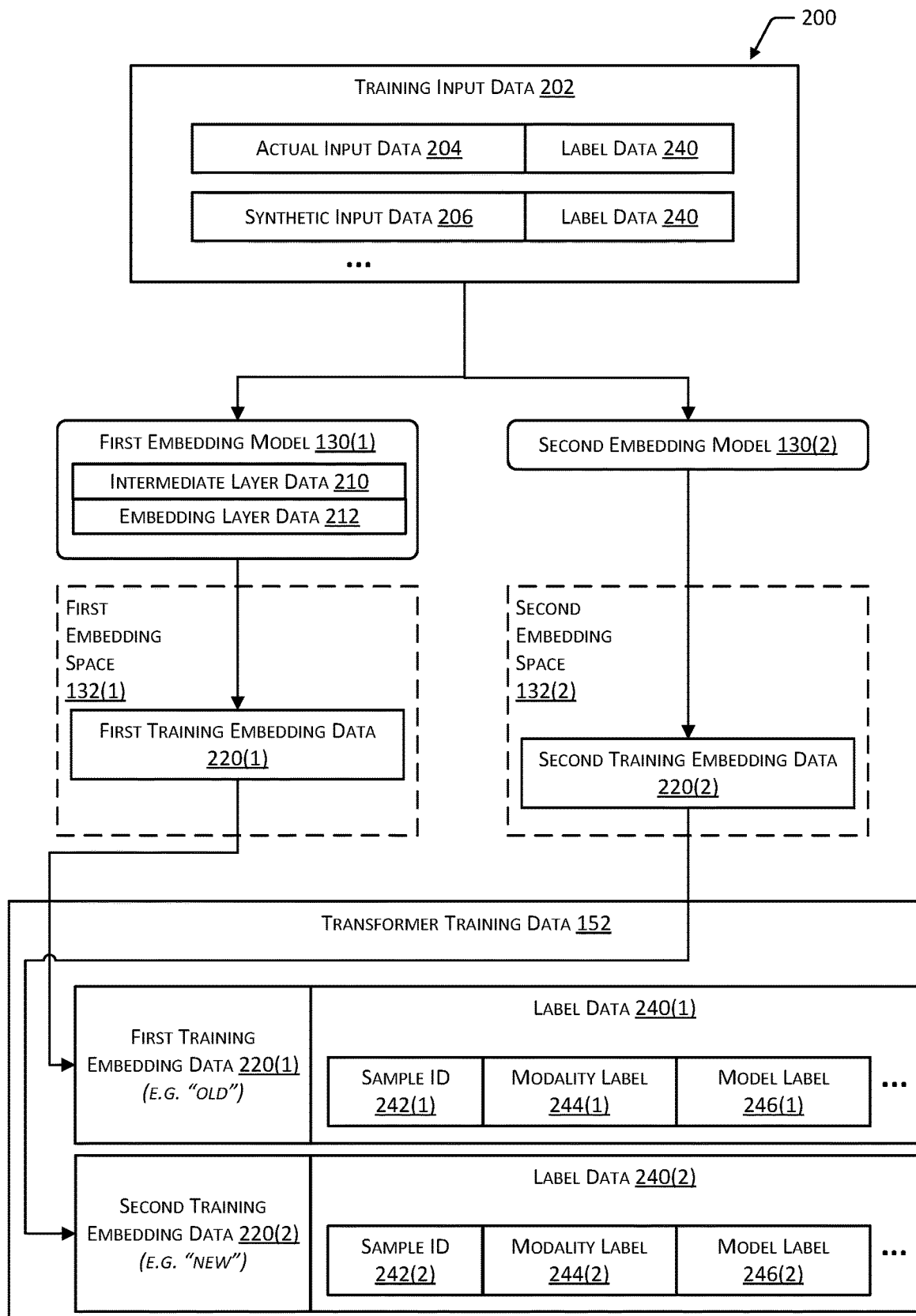
FIG. 2 illustrates processing training input data to determine transformer training data, according to some implementations.

FIG. 2 illustrates at 200 a method of processing training input data to determine transformer training data 152, according to some implementations. The preparation of transformer training data 152 may be implemented by one or more computing devices 106. Transformer training data 152 is acquired for use in training the transformer module 150, with that training expressed as the weight data 154.

Training input data 202 is shown. The training input data 202 may comprise one or more of actual input data 204 with associated label data 240 or synthetic input data 206 with associated label data 240. The actual input data 204 may comprise actual input image data 112 that has been acquired from individuals who have opted in to provide training data. In one implementation, the training input data 202 may exclude individuals who have enrolled to use of the system for identification. In another implementation, some enrolled users may opt in to explicitly permit input image data 112 obtained during enrollment to be stored as actual input data 204 for later training.

The synthetic input data 206 may comprise synthetic data that is consistent with expected input image data 112. For example, the synthetic input data 206 may comprise output from a generative adversarial network (GAN) that has been trained to produce synthetic images of a user's hand. In some implementations, the synthetic data may be based on actual input data 204. In other implementations, other techniques may be used to determine the synthetic input data 206.

The label data 240 may comprise information such as a sample identifier (ID) 242, modality label 244, model label 246, and so forth. The sample ID 242 indicates a particular training identity. The modality label 244 indicates whether the associated input data is representative of a first modality, second modality, and so forth. The model label 246, discussed later may indicate the embedding model 130 used to determine the training embedding data 220.

The training input data 202 is processed by at least two embedding models. In the following examples, the first embedding model 130(1) may be considered the "old" or "existing" embedding model 130, while the second embedding model 130(2) may be considered the "new" or "updated" embedding model 130. For these examples, the first embedding model 130(1) may be assumed to be deprecated and discontinued for use as an embedding network module 120 at a future time, after which the second embedding model 130(2) will be used.

The first embedding model 130(1) is used to process input data from the training input data 202, generating first training embedding data 220(1) that is in the first embedding space 132(1). In some implementations, the first training embedding data 220(1) comprises, or is based on, intermediate layer data 210 and embedding layer data 212. The intermediate layer data 210 may comprise values associated with one or more layers of the first embedding model 130(1) while processing input. The embedding layer data 212 comprises the embedding data that is provided by output of the first embedding model 130(1). In one implementation, the intermediate layer data 210 may comprise values of a penultimate layer of a neural network of the first embedding model 130(1). The penultimate layer may comprise the layer preceding the final output of the embedding layer data 212. In one implementation, the intermediate layer data 210 may comprise the values of a fully connected linear layer that precedes the output of the embedding layer data 212. For example, the embedding layer data 212 may have a vector of size 128, while the intermediate layer data 210 has a vector of size of 1280.

Continuing the implementation discussed above, the first training embedding data 220(1) may comprise a concatenation of the intermediate layer data 210 and the embedding layer data 212. In other implementations, the intermediate layer data 210 and the embedding layer data 212 may be otherwise combined.

In some implementations, use of the intermediate layer data 210 results in a substantial improvement in overall performance of the system.

The same training input data 202 is also processed with the second embedding model 130(2), generating second training embedding data 220(2). This pair of training embedding data 220(1) and 220(2) may be associated with one another by a common value of sample ID 242. This pair is thus representative of the same input data, from the training input data 202, as expressed in two different embedding spaces 132. Each instance of training embedding data 220 may have associated label data 240. This associated label data 240 may include a model label 246 that is indicative of the embedding model 130 used to generate the particular training embedding data 220.

The transformer training data 152, comprising first training embedding data 220(1), second training embedding data 220(2), and associated or implied label data 240 may not be used to train a transformer network module 310 within a transformer module 150, as described next.

Figure 3:
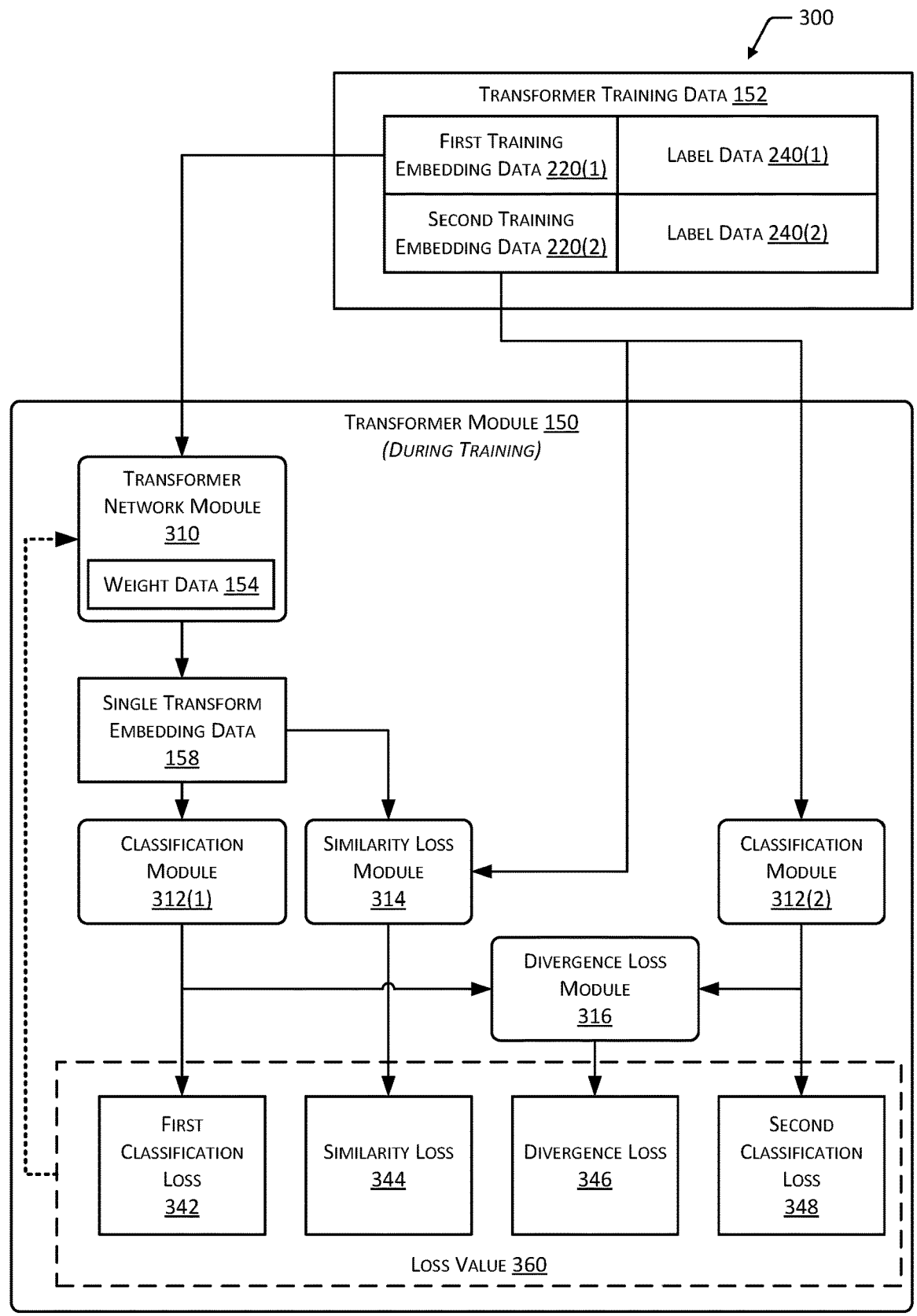
FIG. 3 illustrates a transformer module during training, according to some implementations.

FIG. 3 illustrates a transformer module 150 during training, according to some implementations. The transformer module 150 may be implemented by one or more computing devices 106. The transformer module 150 comprises a transformer network module 310, classification modules 312, similarity loss module 314, and a divergence loss module 316.

The transformer network module 310 may comprise a neural network. During training, the transformer network module 310 accepts as input first training embedding data 220(1), associated with the first embedding space 132(1), and produces as output single transform embedding data 158. As training progresses, the quality of the resulting single transform embedding data 158 may be expected to improve due to the loss values 360 that are returned as described below.

The single transform embedding data 158 is processed by a first classification module 312(1) to determine a first classification loss 342. In one implementation, the classification module 312 may utilize a HyperSpherical loss function as shown with regard to equations 1 and 2. In other implementations, other classification loss functions may be used. For example, other classification functions such as Softmax, Cosine, AM-Softmax, Arcface, large margin cosine loss, and so forth may be used.

The HyperSpherical Loss (HSL) function may also be used during training of the embedding models 130. The HSL loss minimizes L which is the sum of a cross-entropy term, and a regularization term to regularize the confidence score (weighted by $\lambda$). $W_j$ denotes a classifier weight for $j^{th}$ class. C is the total number of training classes. M is the minibatch size. In in these equations m is a fixed angular margin. $\hat{W}$ and $\hat{x}$ are the unit-normalized form of W and x respectively. Also in these equations $x_i$ (embedding vector of input I) and $s_i$ are both outputs of the embedding model 130, where $s_i$ is used only during training.

$$L = -\frac{1}{M}\sum_{i=1}^{M}\left(\log p_i - \lambda s_i^2\right) \quad (1)$$

$$p_i = \frac{e^{S_i\left(\hat{W}_{y_i}^T \hat{x}_i - m\right)}}{e^{S_i\left(\hat{W}_{y_i}^T \hat{x}_i - m\right)} + \sum_{j=1, j \neq y_i}^{C} e^{\hat{W}_j^T \hat{x}_i}} \quad (2)$$

The second training embedding data 220(2) is processed by a second classification module 312(2) to determine a second classification loss 348. The second classification module 312(2) may utilize the same loss function as the first classification module 312(1). For example, the second classification module 312(2) may utilize the HyperSpherical loss function.

The similarity loss module 314 accepts as input the single transform embedding data 158 and the second training embedding data 220(2) and determines a similarity loss 344.

In one implementation, the similarity loss module 314 may implement a mean squared error (MSE) and cosine distance loss function. In other implementations, other loss functions may be used. For example, an MSE loss may be used.

The divergence loss module 316 accepts as input the first classification loss 342 and the second classification loss 348 and determines a divergence loss 346. In one implementation, the divergence loss module 316 may implement a Kullback-Leibler divergence (KLD) function.

Loss value(s) 360 comprising one or more of the first classification loss 342, the second classification loss 348, the similarity loss 344, or the divergence loss 346 are then provided back to the transformer network module 310 for subsequent iterations during training.

Figure 4:
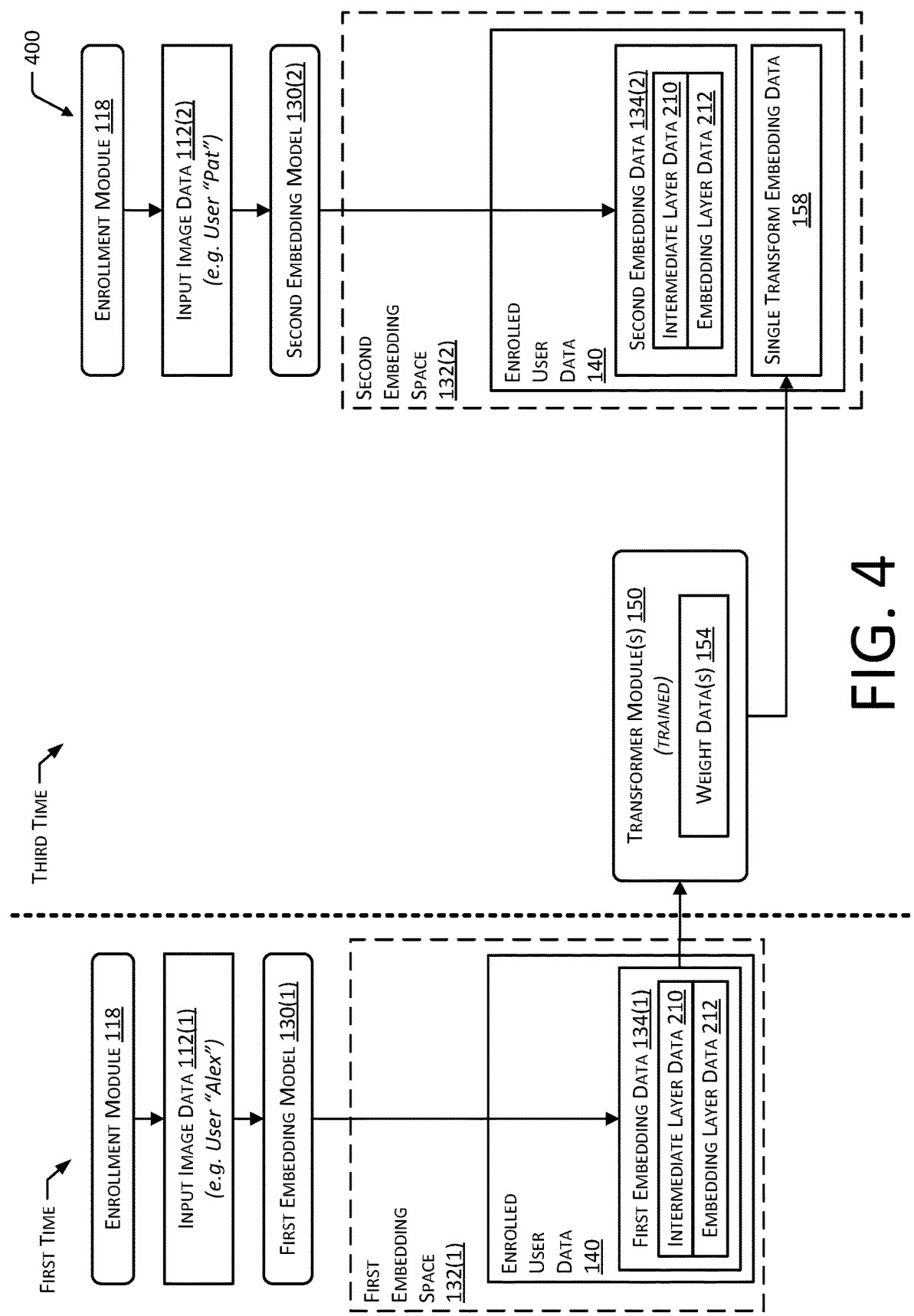
FIG. 4 illustrates a trained transformer module to determine single transform embedding data, according to some implementations.

FIG. 4 illustrates at 400 a trained transformer module 150 used to determine single transform embedding data 158, according to some implementations. The trained transformer module 150 may be implemented by one or more computing devices 106.

As described above, at a first time, the enrollment module 118 is used to acquire input image data 112(1) for a user "Alex". This input image data 112(1) is processed by a first embedding model 130(1) to determine first embedding data 134(1) representative of Alex in a first embedding space 132(1).

In some implementations, the first embedding data 134(1) comprises, or is based on, intermediate layer data 210 and embedding layer data 212. The intermediate layer data 210 may comprise values associated with one or more layers of the first embedding model 130(1) while processing the input image data 112(1). The embedding layer data 212 comprises the embedding data that is provided by output of the first embedding model 130(1). In one implementation, the intermediate layer data 210 may comprise values of a penultimate layer of a neural network of the first embedding model 130(1). The penultimate layer may comprise the layer preceding the final output of the embedding layer data 212. In one implementation, the intermediate layer data 210 may comprise the values of a fully connected linear layer that precedes the output of the embedding layer data 212. The first embedding data 134(1) may comprise a concatenation of the intermediate layer data 210 and the embedding layer data 212. In other implementations, the intermediate layer data 210 and the embedding layer data 212 may be otherwise combined.

At the first time, the enrolled user data 140 comprises the first embedding data 134(1) for Alex and associated identification data 142 (not shown). For example, the enrolled user data 140 may comprise one or more of the embedding layer data 212, intermediate layer data 210, data based on both, and so forth.

At a third time, the embedding network modules 120 have been modified, and the second embedding model 130(2) is now in use. The transformer module 150, trained as described in FIG. 3, is used to convert or transform the first embedding data 134(1) to the single transform embedding data 158, with the single transform embedding data 158 being in the second embedding space 132(2). This single transform embedding data 158 is stored in the enrolled user data 140, along with the associated identification data 142 for Alex.

Also at the third time, a new user "Pat" has decided to enroll in using the system. The enrollment module 118 is used to acquire input image data 112(2) for the user "Pat". This input image data 112(2) is processed using the second embedding model 130(2) to determine second embedding data 134(2) that is representative of Pat. In some implementations, the second embedding data 134(1) may comprise, or is based on, intermediate layer data 210 and embedding layer data 212 during operation of the second embedding model 130(2).

The enrolled user data 140 now comprises embedding data 134 for a consistent embedding space 132, in this example the second embedding space 132(2). In one implementation, the first embedding data 134 may be retained in the enrolled user data 140. In another implementation, the first embedding data 134 may not be retained in the enrolled user data 140.

In some implementations, the trained transformer module(s) 150 may be used to convert embedding data 134 in an offline process. For example, while transitioning from using a first embedding model 130(1) to a second embedding model 130(2), the previously stored first embedding data 134(1) may be processed in a batch with the transformer module 150 to determine the second embedding data 134(2). Such conversion may thus be completed before a query that would utilize the new embedding data 134 is received. This implementation eliminates latency in asserting identity that may result from an online or on-demand conversion process.

In some situations, different embedding models 130 may be in use by the system 100 at the same time. For example, a first version of the scanner 104 that is deployed may use the first embedding model 130(1) to determine first embedding data 134 while a second version of the scanner 104 that is deployed may use the second embedding model 130(2). The system 100 may use the techniques described in this disclosure to support these different versions in determining the asserted identification data 164.

Figure 5A:
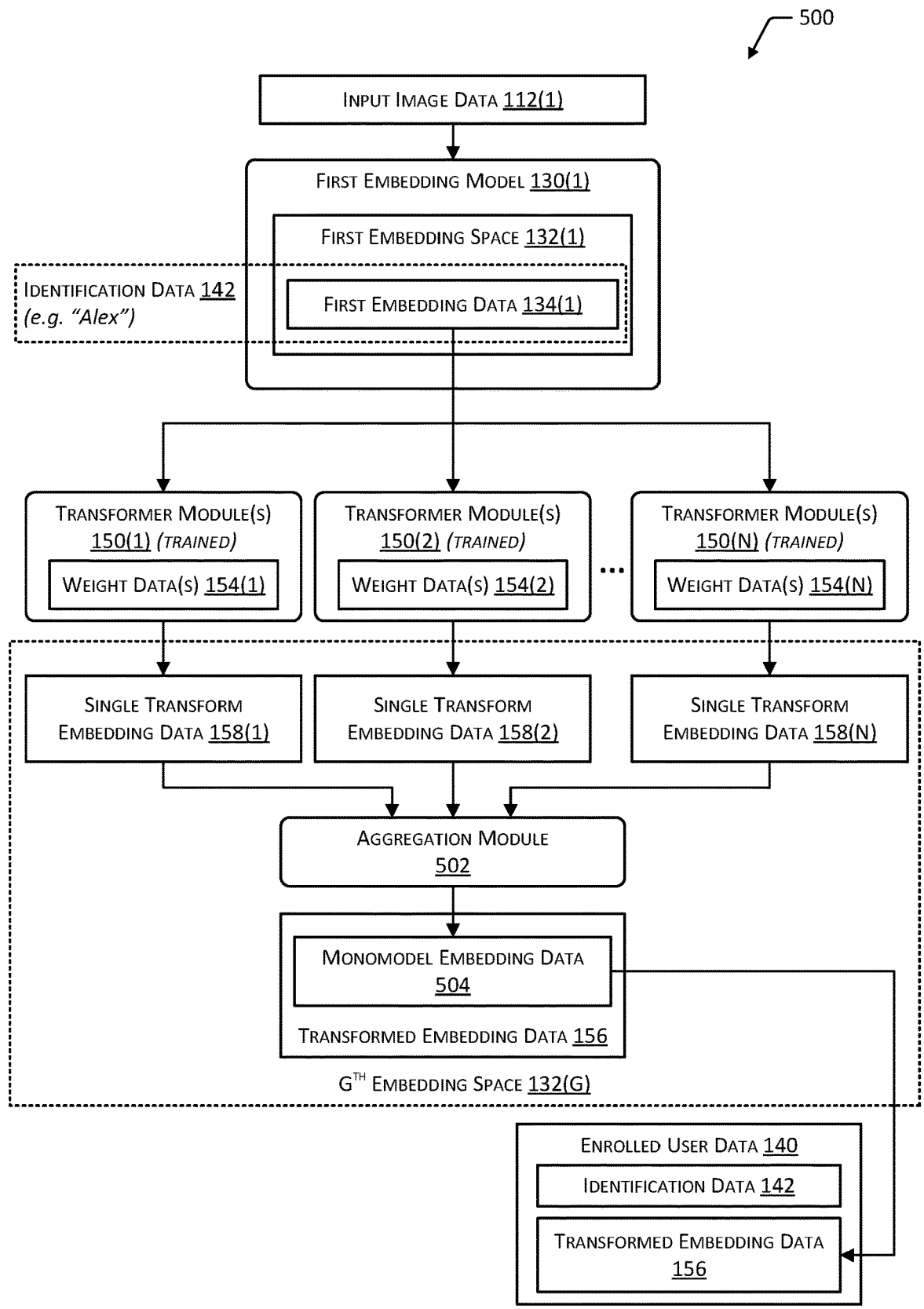
FIG. 5A is a block diagram of aggregating output from a plurality of transformer modules to determine transformed embedding data comprising monomodel embedding data, according to some implementations.

FIG. 5A is a block diagram 500 of aggregating output from a plurality of transformer modules 150 to determine transformed embedding data 156 comprising monomodel embedding data, according to some implementations. The transformer modules 150 and aggregation may be implemented by one or more computing devices 106.

As mentioned above, input image data 112 is processed by an embedding model 130 to determine embedding data 134. In this illustration, first input image data 112(1) is processed by a first embedding model 130(1) to determine first embedding data 134(1).

The first embedding data 134(1) is provided as input to a plurality of previously trained transformer modules 150(1), 150(2), . . . , 150(N). As described above, the first embedding data 134(1) is associated with a first embedding space 132(1). The first embedding data 134(1) may comprise, or may be based on, intermediate layer data 210 and embedding layer data 212. The intermediate layer data 210 may comprise values associated with one or more layers of the first embedding model 130(1) while processing input. The embedding layer data 212 comprises the embedding data that is provided by output of the first embedding model 130(1). In one implementation, the intermediate layer data 210 may comprise values of a penultimate layer of a neural network of the first embedding model 130(1). The penultimate layer may comprise the layer preceding the final output of the embedding layer data 212. The first embedding data 134(1) may be associated with a particular identity, such as user "Alex".

Each of the transformer modules 150(1)-(N) may be trained as described above with regard to FIG. 3. In some implementations, each transformer module 150(N) of the plurality may be trained using the same set of transformer training data 152, or different sets of transformer training data 152. Even in the event the same transformer training data 152 is used, differences in initial conditions and other factors will result in different weight data 154 resulting for each of the transformer modules 150(N) in the plurality.

During processing, each of the trained transformer modules 150(1)-(N) accepts as input the first embedding data 134(1) and produces respective single transform embedding data 158(1), 158(2), . . . , 158(N) in a $G^{th}$ embedding space 132(G). While each single transform embedding data 158 is based on the same first embedding data 134(1), they may differ from one another in their respective values due to the varied weight data 154 for the respective transformer modules 150.

The set of single transform embedding data 158(1), 158(2), . . . , 158(N) may be aggregated by an aggregation module 502 to determine the transformed embedding data 156 in the $G^{th}$ embedding space 132(G). In particular, the output from the aggregation module 502 in this implementation may be monomodel embedding data 504, indicating that a single embedding model 130 was used as input to the participating transformer modules 150.

In some implementations, the $G^{th}$ embedding space 132(G) may comprise the embedding space 132 associated with a particular embedding model 130 that is used during inference. For example, the embedding model 130(Y) is used to determine the query embedding data 162(Y) that is in in the embedding space 132(Y). The transformed embedding data 156 may be represented within the embedding space 132(Y). During determination of the asserted identification data 164, the system 100 may then compare the query embedding data 162(Y), without intermediate transformation, to the transformed embedding data 156. This may improve performance of the system 100 by reducing the latency in determining asserted identification data 164, computational requirements to determine the asserted identification data 164, and so forth.

In one implementation, the aggregation module 502 may calculate the monomodel embedding data 504 as an average of the vector values of the transformed embedding data 156(1), 156(2), . . . , 156(N). In other implementations, the aggregation module 502 may utilize other functions. For example, a weighted average may be used, with different weights associated with the single transform embedding data 158 from different transformer modules 150. In another example, a sum of the single transform embedding data 158 may be performed.

In another implementation, the aggregation module 502 may comprise a machine learning system that utilizes one or more machine learning techniques to determine the transformed embedding data 156. For example, the aggregation module 502 may utilize a previously trained neural network. Continuing the example, the aggregation module 502 may include a neural aggregation network. ("Neural Aggregation Network for Video Face Recognition", Yang, et. al., arXiv: 1603.05474v4, 2 Aug. 2017.)

The transformed embedding data 156 comprising the monomodel embedding data 504 in the Gth embedding space 132(G) determined by the aggregation module 502 may be subsequently stored in the enrolled user data 140.

Colloquially, the implementation depicted in FIG. 5A allows each transformer module 150 which has "learned" differently from other transformer modules 150 to contribute to the final transformed embedding data 156.

Figure 5B:
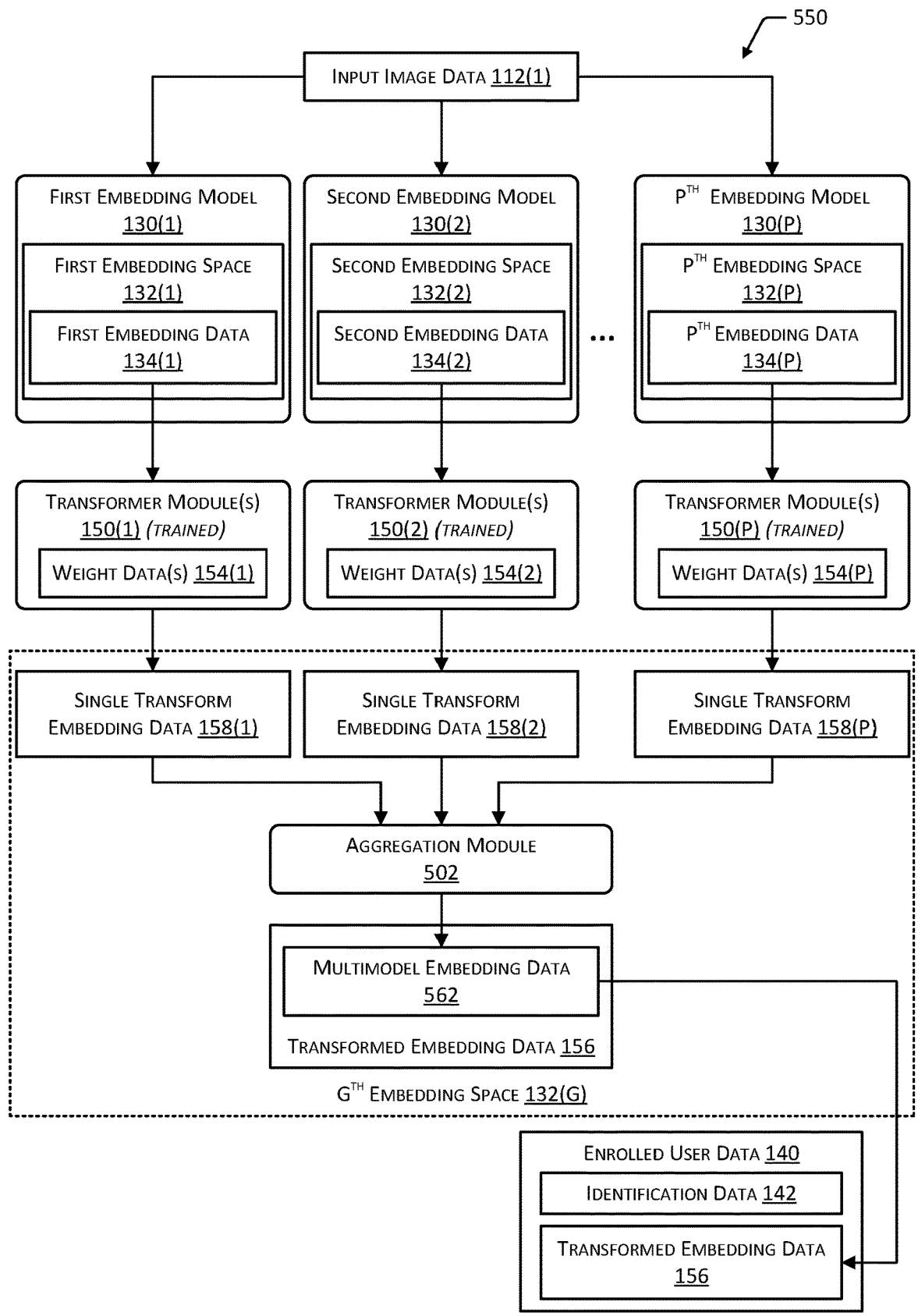
FIG. 5B is a block diagram of aggregating output from a plurality of transformer modules that accept different embedding data produced by different embedding models as input, to determine transformed embedding data comprising multimodal embedding data, according to some implementations.

FIG. 5B is a block diagram 550 of aggregating output from a plurality of transformer modules 150 that accept different embedding data 134 produced by different embedding models as input, to determine transformed embedding data 156 comprising multimodel embedding data, according to some implementations. The transformer modules 150 and aggregation may be implemented by one or more computing devices 106.

The system 100 may utilize different embedding models 130. For example, new embedding models 130 may be added, old embedding models 130 may be deprecated, particular embedding models 130 may be designed for particular use cases, and so forth. Continuing the example, the first embedding model 130(1) may be designed for the use case to produce more detailed embedding data 134, but may take longer to execute (have greater latency) than desired for use during identification. In comparison, a second embedding model 130(2) may be designed for the use case to execute more quickly (lower latency), but does not produce embedding data 134 with as much detail.

The techniques mentioned above may be used to convert or transform the embedding data 134 from one embedding space 132 to another. The embedding data 134 in a plurality of embedding spaces 132 may be retained and used to facilitate further transformations of embedding data 134.

As mentioned above, input image data 112 is processed by an embedding model 130 to determine embedding data 134. In this illustration, first input image data 112(1) processed by a plurality of embedding models 130(1) to determine first embedding data 134(1), second embedding data 134(2), and $P^{th}$ embedding data 134(P) is depicted. The first embedding data 134(1), second embedding data 134(2), and $P^{th}$ embedding data 134(P) are all associated with the same identification data 142, such as user Alex.

The embedding data 134(1)-134(P) may comprise, or may be based on, intermediate layer data 210 and embedding layer data 212. The intermediate layer data 210 may comprise values associated with one or more layers of the first embedding model 130(1) while processing input. The embedding layer data 212 comprises the embedding data that is provided by output of the respective embedding models 130. In one implementation, the intermediate layer data 210 may comprise values of a penultimate layer of a neural network of the respective embedding model 130. The penultimate layer may comprise the layer preceding the final output of the embedding layer data 212 of the respective embedding model 130.

The embedding data 134 is provided to respective transformer modules 150 that have been trained to convert input into a $G^{th}$ embedding space 132(G). For example: first embedding data 134(1) is provided as input to a first transformer module 150(1) that determines single transform embedding data 158(1). Second embedding data 134(2) is provided as input to a second transformer module 150(2) that determines single transform embedding data 158(2). $P^{th}$ embedding data 134(P) is provided as input to a $P^{th}$ transformer module 150(1) that determines single transform embedding data 158(P).

An aggregation module 502 aggregates the set of transformed embedding data 156(1)-(P) to determine the transformed embedding data 156 in the $G^{th}$ embedding space 132(G). In particular, the output from the aggregation module 502 in this implementation may be multimodel embedding data 562, indicating that a plurality of embedding models 130 were used as input to the participating transformer modules 150.

In one implementation, the aggregation module 502 calculates the multimodel embedding data 562 as an average of the vector values of the single transform embedding data 158(1), 158(2), . . . , 158(P). In other implementations, the aggregation module 502 may utilize other functions.

For example, a weighted average may be used, with different weights associated with the single transform embedding data 158 from different transformer modules 150. In another example, a sum of the single transform embedding data 158 may be performed.

In another implementation, the aggregation module 502 may utilize one or more machine learning techniques to determine the transformed embedding data 156. For example, the aggregation module 502 may utilize a previously trained neural network, such as a neural aggregation network.

The transformed embedding data 156 comprising the multimodel embedding data 562 in the Gth embedding space 132(G) determined by the aggregation module 502 may be subsequently stored in the enrolled user data 140.

Colloquially, this implementation may be considered as though each of the different embeddings for the same identity have contributed some information to the final transformed embedding data 156.

Figure 5C:
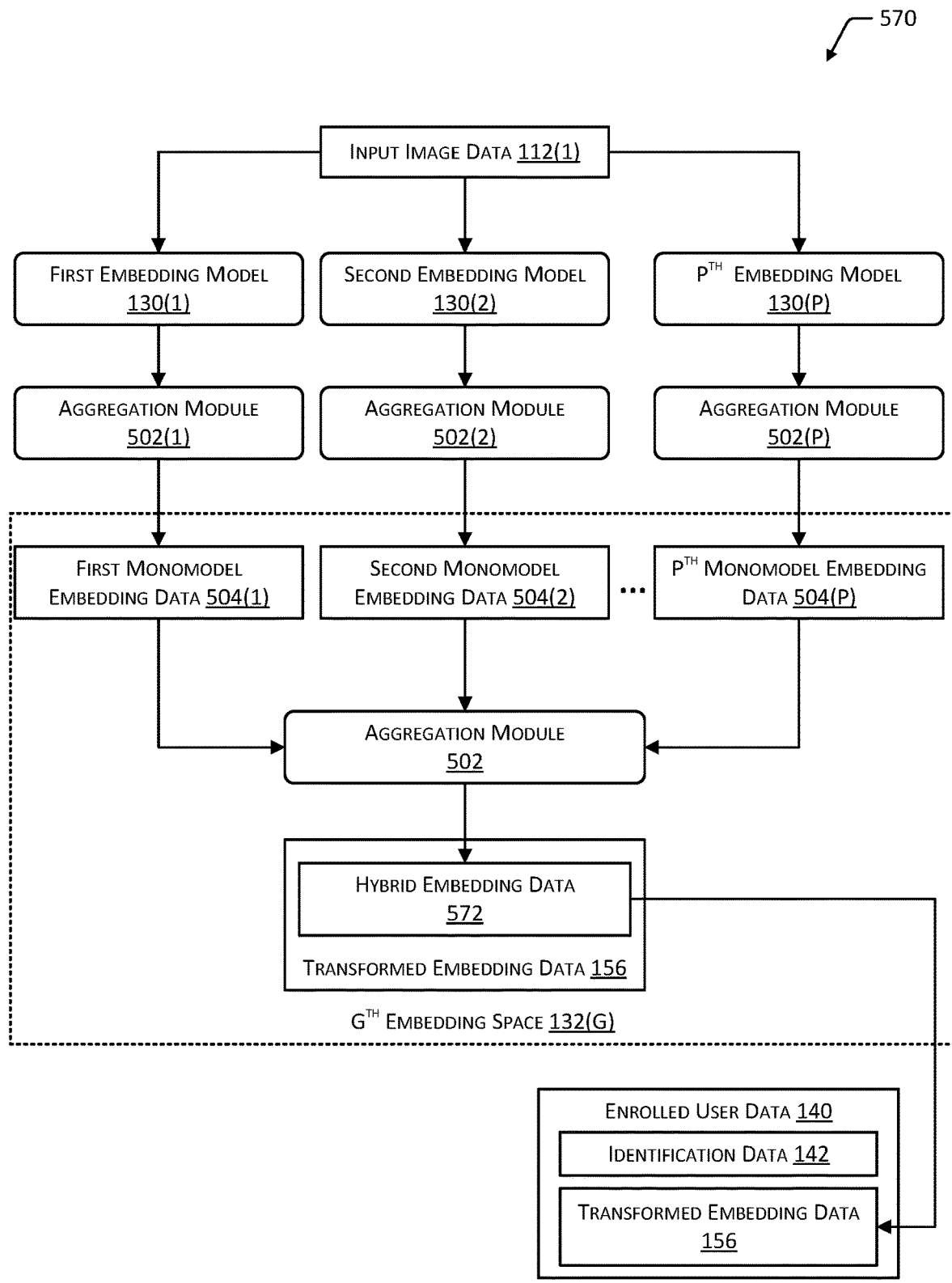
FIG. 5C is a block diagram of determining hybrid embedding data using monomodel embedding data and multimodel embedding data, according to some implementations.

FIG. 5C is a block diagram 570 of determining hybrid embedding data using monomodel embedding data 504 and multimodel embedding data 562, according to some implementations. The processing may be implemented by one or more computing devices 106.

A plurality of embedding models 130(1)-(P) may be used to determine corresponding embedding data 134(1)-(P) based on input image data 112. The embedding data 134(1)-(P) may then be processed as discussed above with regard to FIG. 5A to determine a plurality of monomodel embedding data 504(1)-(P). For example, each of the monomodel embedding data 504 may itself comprise an aggregation from a plurality of single transform embedding data 158, each having been determined using a different transformer module 150.

An aggregation module 502 aggregates the plurality of monomodel embedding data 504(1)-(P) to determine the transformed embedding data 156 in the Gth embedding space 132(G). In particular, the output from the aggregation module 502 in this implementation may be hybrid embedding data 572, indicating that a plurality of embedding models 130 and a plurality of transformer models 150 were used.

In one implementation, the aggregation module 502 calculates the hybrid embedding data 572 as an average of the vector values of the plurality of monomodel embedding data 504(1)-(P). In other implementations, the aggregation module 502 may utilize other functions. For example, a weighted average may be used, with different weights associated with the different plurality of monomodel embedding data 504 (1)-(P). In another example, a sum of the plurality of monomodel embedding data 504(1)-(P) may be performed.

In another implementation, the aggregation module 502 may utilize one or more machine learning techniques to determine the transformed embedding data 156. For example, the aggregation module 502 may utilize a previously trained neural network, such as a neural aggregation network.

The transformed embedding data 156 comprising the hybrid embedding data 572 in the Gth embedding space 132(G) determined by the aggregation module 502 may be subsequently stored in the enrolled user data 140.

Figure 6:
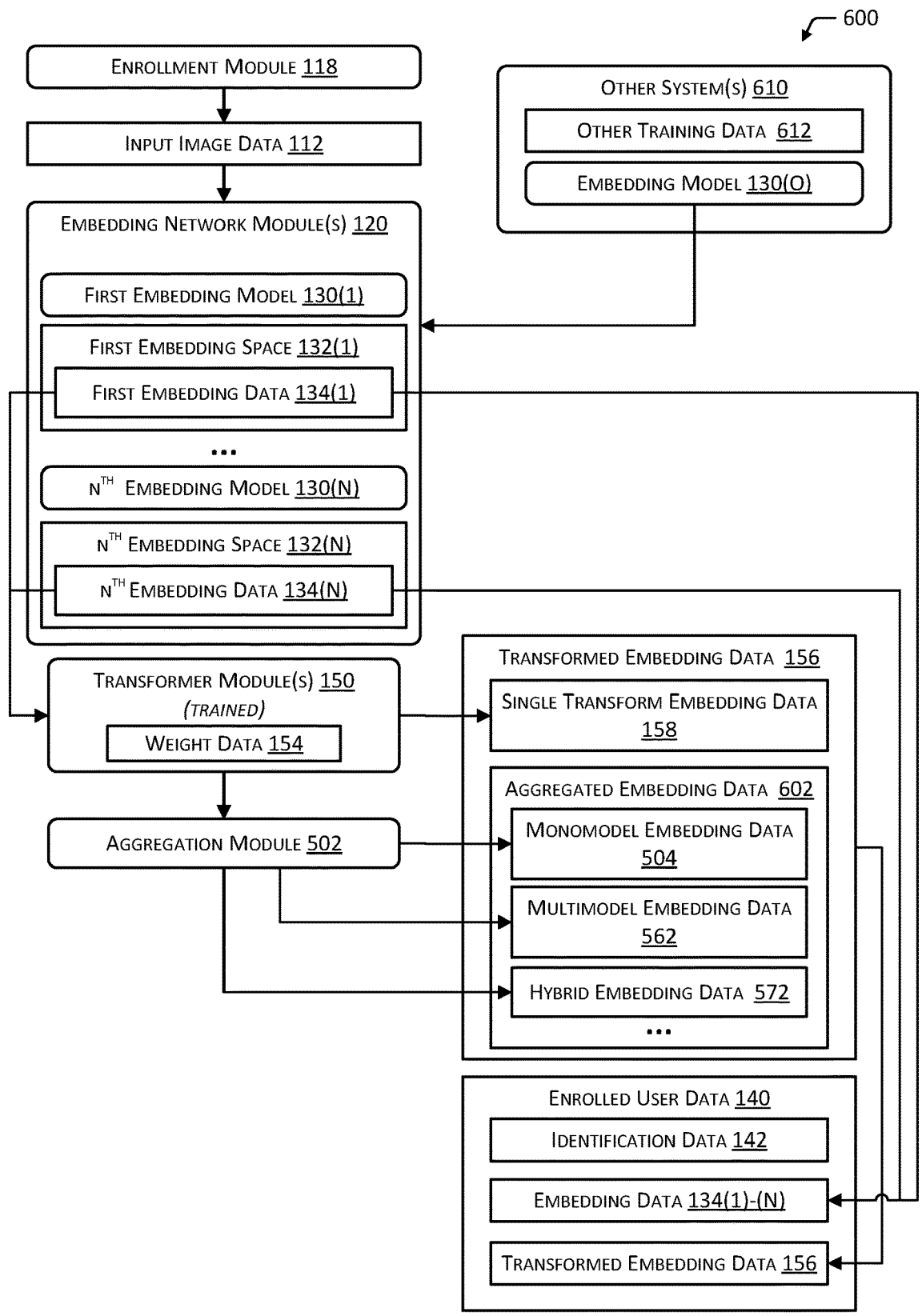
FIG. 6 illustrates the system determining enrolled user data comprising aggregated embedding data, according to some implementations.

FIG. 6 illustrates at 600 the system 100 determining enrolled user data 140 comprising aggregated embedding data 602, according to some implementations. The system 100 may be implemented by one or more of the scanner 104, the computing device 106, or other devices. While the system 100 is described with respect to biometric information, the system and techniques described herein may be used in other situations.

During enrollment, the enrollment module 118 may coordinate the determination and association of transformed embedding data 156 with particular identification data 142. In this implementation, the user opts in and input image data 112 of the user's hand 102 to be enrolled is acquired. For example, the scanner 104 may be used to acquire the input image data 112. The input image data 112 may comprise one or more images acquired using one or more modalities. For example, the input image data 112 may comprise an image acquired using the first modality and an image acquired using the second modality.

As described above, with regard to FIG. 1, the input image data 112 is provided to an embedding network module 120. One or more embedding models 130(1)-(N) are used to determine embedding data 134(1)-(N). The one or more embedding models 130(1)-(N) may be trained using the same or different sets of training data. For example, the same set of training data available to the system 100, or a subset thereof, may be used to train embedding models 130(1)-(N). One or more of the (trained) embedding models 134(N) may be obtained from another system 100. In one implementation an other system 610 may use other training data 612 to train an embedding model 130(O). For example, the other training data 612 may be proprietary to the other system 610. The other system 610 may train the embedding model 130(O) using this other training data 612. The (trained) embedding model 130(O) may be provided to the system 100 for subsequent use, without disclosing or otherwise transferring the other training data 612. This allows the other training data 612 that would otherwise be inaccessible to the system 100 to be used to train embedding models 130, further improving operation of the system 100.

The trained transformer modules 150 transform the embedding data 134 into single transform embedding data 158. In one implementation, such as described above with respect to FIG. 1, the transformed embedding data 156 may comprise the single transform embedding data 158. In the implementation depicted in FIG. 6, the single transform embedding data 158 may be aggregated using one or more of the techniques described with respect to FIG. 5A, 5B, or 5C to determine aggregated embedding data 602. The aggregated embedding data 602 may comprise one or more of the monomodel embedding data 504, the multimodel embedding data 562, or the hybrid embedding data 572.

During the enrollment process, the submitted embedding data 134, determined aggregated embedding data 602, or a portion thereof, may be checked to determine whether the user has been previously enrolled. A successful enrollment may comprise storage as enrolled user data 140 of identification data 142, such as name, telephone number, account number, and so forth, one or more of: the embedding data 134(1)-(N) or the transformed embedding data 156 which may comprise the aggregated embedding data 602. In some implementations, the enrolled user data 140 may comprise additional information associated with processing of the input image data 112 with an embedding model 130. For example, the enrolled user data 140 may comprise intermediate layer data, such as the values of one or more penultimate layers of one or more of the embedding models 130 used to determine the aggregated embedding data 602.

The aggregated embedding data 602, representative of the embedding data within the Gth embedding space 132(G) may be subsequently used to determine whether query embedding data 162 corresponds to a previously enrolled user. For example, the comparison module 160 may accept as input query embedding data 162 and access the aggregated embedding data 602 to determine if identification data 142 is associated with the query. This is described next with regard to FIG. 7.

In some implementations, storage of one or more of the embedding data 134 or at least a portion of the transformed embedding data 156, such as the aggregated embedding data 602, allows for gallery data comprising input image data 112 acquired during enrollment to not be retained. For example, by storing the embedding data 134, the input image data 112 used as input to determine the embedding data 134 may be never stored or be deleted from storage.

In some implementations individual single transform embedding data 158 may also not be retained. For example, the stored enrolled user data 140 may comprise the identification data 142 and the aggregated embedding data 602, omitting the single transform embedding data 158. One or both of these characteristics improve overall privacy for the user, reduces a quantity of data that has to be securely stored, and still allows for ongoing updates to the embedding network modules 120. For example, the embedding models 130 in use may be updated, deprecated, replaced, or added to at a later time, while still maintaining system functionality to accurately identify users.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

Figure 7:
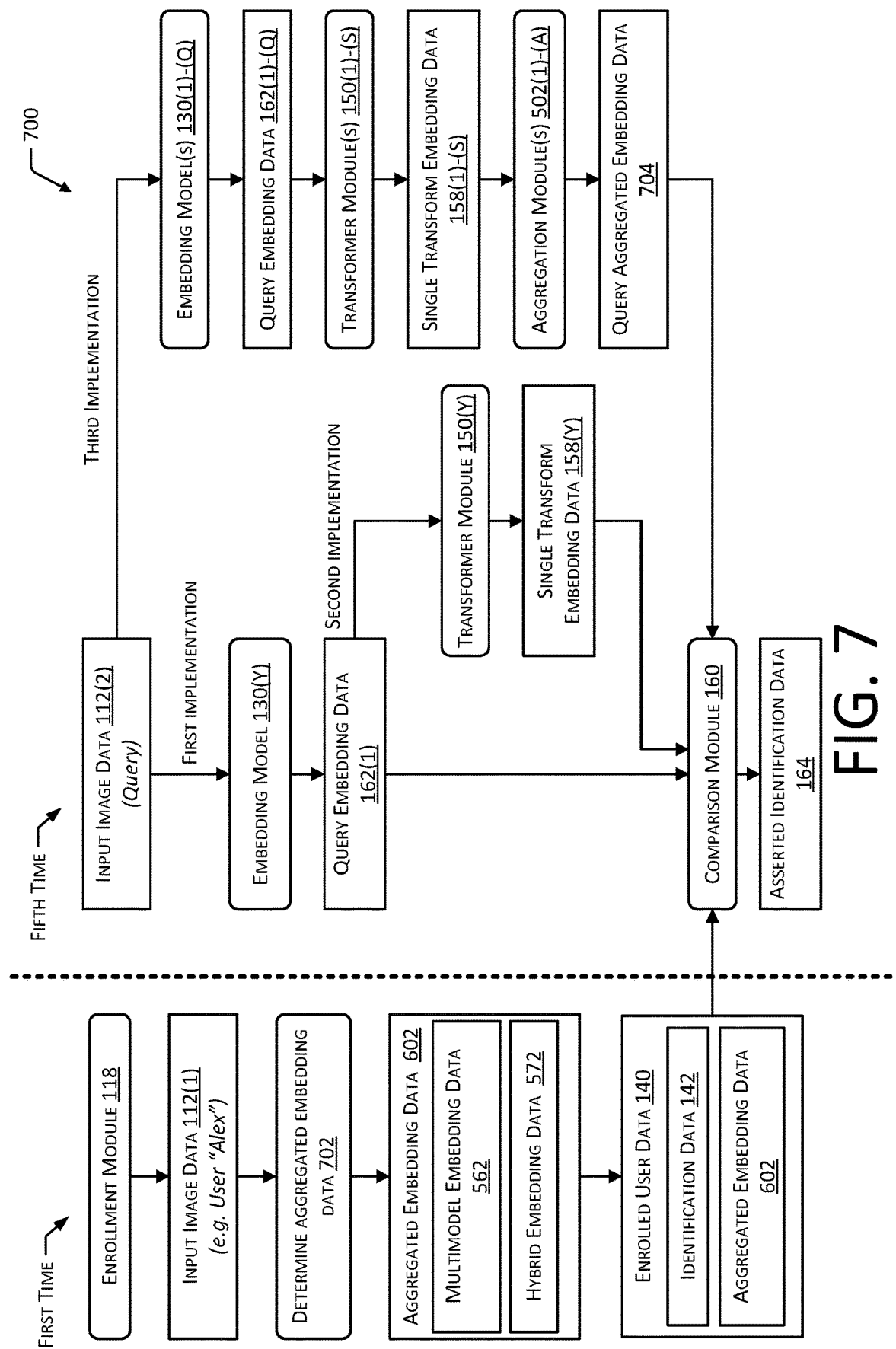
FIG. 7 illustrates using aggregated embedding data to determine asserted identification data, according to some implementations.

FIG. 7 illustrates at 700 using aggregated embedding data 602 to determine asserted identification data 164, according to some implementations. The system 100 may be implemented by one or more of the scanner 104, the computing device 106, or other devices.

The aggregated embedding data 602 is determined based on the input image data 112. As described above, at a first time, the enrollment module 118 is used to acquire input image data 112(1) for a user "Alex". This input image data 112(1) is processed by one or more embedding models 130 to determine embedding data 134 representative of Alex in the embedding spaces 132 associated with each embedding model 130. The aggregated embedding data 602 may comprise one or more of the monomodel embedding data 504, the multimodel embedding data 562, or the hybrid embedding data 572. In this illustration, the aggregated embedding data 602 comprises one or more of the multimodel embedding data 562 or the hybrid embedding data 572.

The aggregated embedding data 602 determined based on the input image data 112 is associated with the identification data 142. For example, the name and contact information for user "Alex" may be associated with the aggregated embedding data 602 resulting from processing the images of Alex's hand 102.

The determination of the aggregated embedding data 602 may not be completed during a particular enrollment session with the user. For example, the aggregated embedding data 602 may be determined at a later time, such as during a batch operation. This allows for the use of embedding models 130, aggregation model(s) 502, and other techniques that may have latency that is not conducive to immediate processing. For example, one of the embedding models 130 used to determine one of the embedding data 134 that is then aggregated to determine the aggregated embedding data 602 may be relatively large and require additional time or computational resources to run.

In some implementations the enrollment process may have multiple parts. For example, a "quick enrollment" may determine a first aggregated embedding data 602 using low latency embedding models. This may allow immediate use of the system 100. At a later time, such as after one or more additional embedding models 130 have processed the input image data 112, a second aggregated embedding data 602 may be determined and stored as the enrolled user data 140.

At a fifth time, a query input image data 112(2) is determined for processing. For example, the scanner 104 may be used to acquire the input image data 112(2) of a hand 102(2) to attempt to determine the identity associated with the hand 102(2).

Three implementations are shown here. A first implementation compares query embedding data 162 with the aggregated embedding data 602. A second implementation uses single transform embedding data 158(1) as input to the comparison module 160. A third implementation aggregates transformed embedding data 156 to determine query aggregated embedding data 704. The query aggregated embedding data 704 is then used as input to the comparison module 160.

In the first implementation, first query embedding data 162(1) is determined based on using an embedding model 130(Y) to process the input image data 112(2). The first query embedding data 162(1) is provided to the comparison module 160 for processing. In this first implementation, the aggregated embedding data 602 is represented within the embedding space 132(Y) of the embedding model 130(Y). For example, the embedding model 130(Y) may be developed at a later time after the embedding models 130(1)-(N).

The transformer modules 150 may be trained using the embedding model 130(Y), and aggregation as described above may be used to determine the aggregated embedding data 602 within the embedding space 132(Y).

In the second implementation, the first query embedding data 162(1) is processed using a first transformer module 150(Y) to determine the single transform embedding data 158(Y). The single transform embedding data 158(Y) may be provided to the comparison module 160 for processing.

In the third implementation, the comparison module 160 receives query aggregated embedding data 704. One or more embedding models 130(1)-(Q) are used to determine query embedding data 162(1)-(Q) based on a query input image data 112(2). One or more transformer modules 150(1)-(S) are used to determine single transform embedding data 158(1)-(S). One or more aggregation modules 502(1)-(A) are used to determine aggregated embedding data 602. For example, one or more of the techniques described with regard to FIG. 5A, 5B, or 5C may be used to determine the query aggregated embedding data 704. The query aggregated embedding data 704 may be provided to the comparison module 160 for processing.

The comparison module 160 compares the input, such as the query embedding data 162(1), the single transform embedding data 158(Y) or the query aggregated embedding data 704, to the aggregated embedding data 602 stored in the enrolled user data 140 to determine asserted identification data 164. In one implementation, the asserted identification data 164 may comprise a user identifier associated with the closest previously stored aggregated embedding data 602 in the enrolled user data 140 to the input associated with the user who presented their hand 102. The comparison module 160 may utilize other considerations, such as requiring that the query embedding data 162 is no more than a maximum distance in the embedding space 132 from the embedding data 134 of a particular user before determining the asserted identification data 164.

Figure 8:
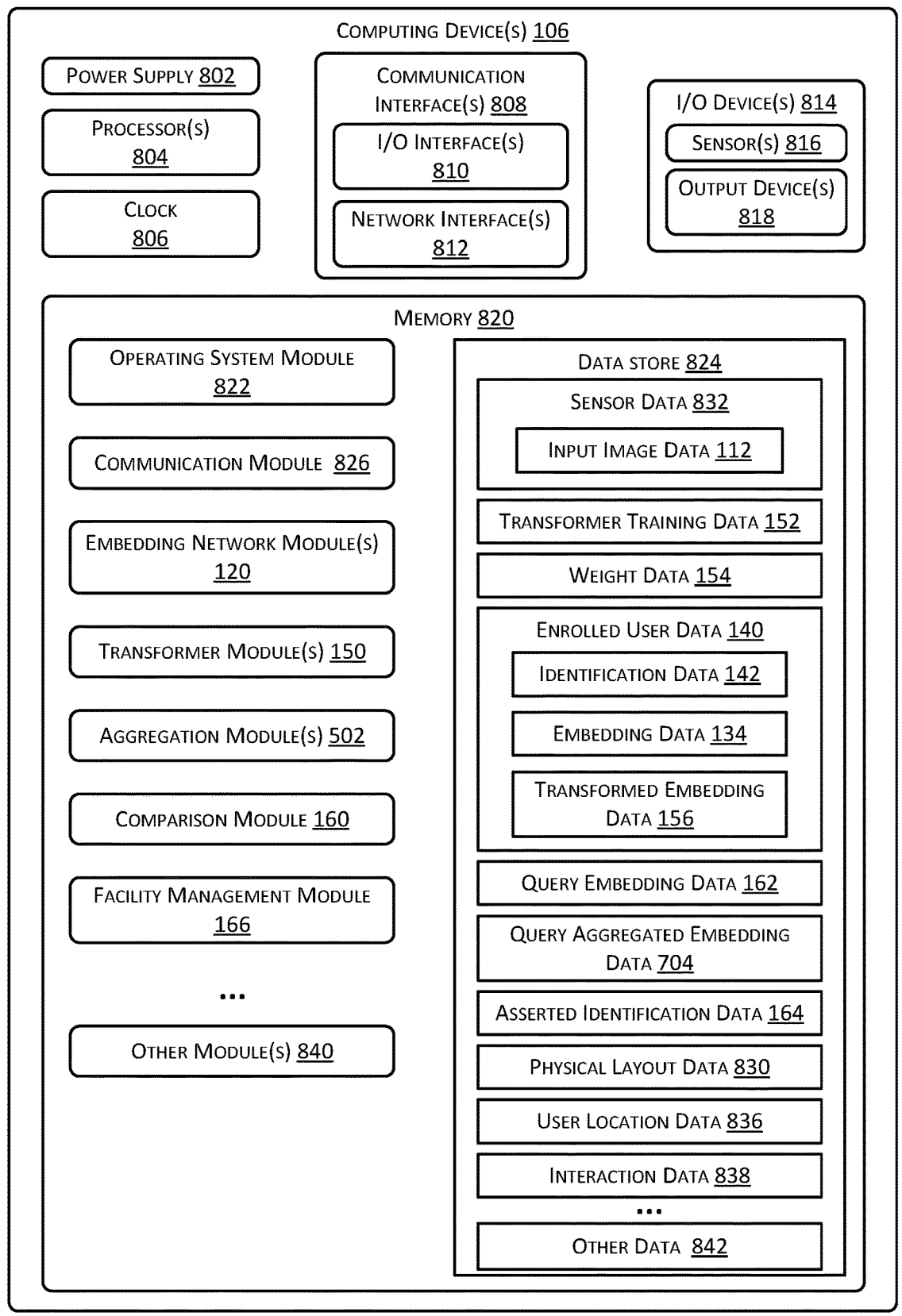
FIG. 8 is a block diagram of a computing device to implement the system, according to some implementations.

FIG. 8 is a block diagram of a computing device 106 to implement the system 100, according to some implementations. The computing device 106 may be within the scanner 104, may comprise a server, and so forth. The computing device 106 may be physically present at the facility, may be accessible by a network, or a combination of both. The computing device 106 does not require end-user knowledge of the physical location and configuration of the system that delivers the services. Common expressions associated with the computing device 106 may include "embedded system", "on-demand computing", "software as a service (SaaS)", "platform computing", "network-accessible platform", "cloud services", "data centers", and so forth. Services provided by the computing device 106 may be distributed across one or more physical or virtual devices.

One or more power supplies 802 may be configured to provide electrical power suitable for operating the components in the computing device 106. The one or more power supplies 802 may comprise batteries, capacitors, fuel cells, photovoltaic cells, wireless power receivers, conductive couplings suitable for attachment to a power source such as provided by an electric utility, and so forth. The computing device 106 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to associate a particular interaction with a particular point in time.

The computing device 106 may include one or more communication interfaces 808 such as input/output (I/O) interfaces 810, network interfaces 812, and so forth. The communication interfaces 808 enable the computing device 106, or components thereof, to communicate with other devices or components. The communication interfaces 808 may include one or more I/O interfaces 810. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include input devices such as one or more of a sensor 816, keyboard, mouse, scanner, and so forth. The I/O devices 814 may also include output devices 818 such as one or more of a display device, printer, audio speakers, and so forth. In some embodiments, the I/O devices 814 may be physically incorporated with the computing device 106 or may be externally placed. The sensors 816 may comprise the camera 108, smartcard readers, touch sensors, microphones, and so forth.

The network interfaces 812 may be configured to provide communications between the computing device 106 and other devices, such as routers, access points, and so forth. The network interfaces 812 may include devices configured to couple to personal area networks (PANs), local area networks (LANs), wireless local area networks (WLANS), wide area networks (WANs), and so forth. For example, the network interfaces 812 may include devices compatible with Ethernet, Wi-Fi, Bluetooth, and so forth.

The computing device 106 may also include one or more buses or other internal communications hardware or software that allow for the transfer of data between the various modules and components of the computing device 106.

As shown in FIG. 8, the computing device 106 includes one or more memories 820. The memory 820 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 820 provides storage of computer-readable instructions, data structures, program modules, and other data for the operation of the computing device 106. A few example functional modules are shown stored in the memory 820, although the same functionality may alternatively be implemented in hardware, firmware, or as a system on a chip (SoC).

The memory 820 may include at least one operating system (OS) module 822. The OS module 822 is configured to manage hardware resource devices such as the I/O interfaces 810, the I/O devices 814, the communication interfaces 808, and provide various services to applications or modules executing on the processors 804. The OS module 822 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 826 may be configured to establish communications with the computing device 106, servers, other computing devices 106, or other devices. The communications may be authenticated, encrypted, and so forth.

Also stored in the memory 820 may be a data store 824 and one or more of the following modules. These modules may be executed as foreground applications, background tasks, daemons, and so forth. The data store 824 may use a flat file, database, linked list, tree, executable code, script, or other data structure to store information. In some implementations, the data store 824 or a portion of the data store 824 may be distributed across one or more other devices including the computing devices 106, network attached storage devices, and so forth.

The data store 824 may store one or more of the transformer training data 152, the trained weight data 154, enrolled user data 140, query embedding data 162, and so forth. The memory 820 may store the embedding network module(s) 120, the transformer module(s) 150, the aggregation module(s) 502, the comparison module 160, the facility management module 166, and so forth.

In some implementations, the input image data 112 may be temporarily stored during processing by the embedding network module 120. For example, the scanner 104 may acquire the input image data 112, determine embedding data 134 based on the input image data 112, and then erase the input image data 112. The resulting embedding data 134 may then be sent to a server or other computing device 106 to perform enrollment, comparison to assert an identity, and so forth.

The facility management module 166 may perform various functions, such as tracking items between different inventory locations, to and from carts, generating restocking orders, directing operation of robots within the facility, using the asserted identification data 164 to associate a particular user identity with a user in the facility, and so forth. During operation, the facility management module 166 may access sensor data 832 such as input image data 112, or data from other sensors.

Information used by the facility management module 166 may be stored in the data store 824. For example, the data store 824 may be used to store physical layout data 830, sensor data 832, query aggregated embedding data 704, asserted identification data 164, user location data 836, interaction data 838, and so forth. For example, the sensor data 832 may comprise the input image data 112 obtained from a scanner 104 associated with the facility.

The physical layout data 830 may provide information indicative of where scanners 104, cameras, weight sensors, antennas for radio receivers, inventory locations, and so forth are in the facility with respect to one another. For example, the physical layout data 830 may comprise information representative of a map or floor plan of the facility with relative positions of gates with scanners 104 and inventory locations.

The facility management module 166 may generate the user location data 836 that is indicative of the location of the user within the facility. For example, the facility management module 166 may use image data obtained by the cameras to determine a location of the user. In other implementations, other techniques may be used for determining the user location data 836. For example, data from a smart floor may be used to determine the location of the user.

The identification data 142 may be associated with user location data 836. For example, the user enters the facility and has their hand 102 scanned by the scanner 104, resulting in asserted identification data 164 that is associated with their time of entry and the scanner 104 location. The user location data 836 indicative of a path of a user that begins at the scanner 104 location at the time of entry may be associated with the user identifier in the asserted identification data 164.

Based on the user location data 836 and the interaction data 838, a particular interaction may be associated with an account of a particular user. For example, if the user location data 836 indicates that the user is present in front of inventory location 892 at time 09:02:02 and the interaction data 838 indicates a pick of a quantity of one item from an area on inventory location 892 at 09:04:13, the user may be billed for that pick.

The facility management module 166 may use the sensor data 832 to generate the interaction data 838. The interaction data 838 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 166 may generate interaction data 838 that indicates what item the user picked from a particular lane on a shelf, and then use this interaction data 838 to adjust the count of inventory stowed at that lane. The interaction data 838 may then be used to bill an account associated with the user identifier that is associated with the user who picked the item.

The facility management module 166 may process the sensor data 832 and generate output data. For example, based on the interaction data 838, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 840 may also be present in the memory 820 as well as other data 842 in the data store 824. For example, a billing module may use the interaction data 838 and the asserted identification data 164 to bill an account associated with a particular user.

The devices and techniques described in this disclosure may be used in a variety of other settings. For example, the system 100 may be used in conjunction with a point-of-sale (POS) device. The user may present their hand 102 to a scanner 104 to provide an indication of intent and authorization to pay with an account associated with the asserted identification data 164. In another example, a robot may incorporate a scanner 104. The robot may use the asserted identification data 164 to determine whether to deliver a parcel to the user, and based on the asserted identification data 164, which parcel to deliver.

While the input to the system 100 is discussed with respect to image data, the system may be used with other types of input. For example, the input may comprise data acquired from one or more sensors, data generated by another system, and so forth. For example, instead of image data produced by the camera 108, the input to the system 100 may comprise an array of data. Other modalities may also be used. For example, the first modality may be visible light, the second modality may be sonar, and so forth.

While the system 100 is discussed with respect to processing biometric data, the system may be used with other types of data. For example, the input may comprise satellite weather imagery, seismic data, product images, data indicative of chemical composition, and so forth. For example, instead of image data produced by the camera 108, the input to the system 100 may comprise an array of data.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a memory, storing first computer-executable instructions; and
   a hardware processor to execute the first computer-executable instructions to:
   at a first time:
      determine input image data that is associated with first identification data;
      determine a first plurality of embedding data based on processing the input image data with each of a first plurality of embedding models;
      determine a first plurality of single transform embedding data based on processing the first plurality of embedding data with a first plurality of transformer networks, wherein the first plurality of single transform embedding data is representative of a first embedding space;
      determine first aggregated embedding data based on the first plurality of single transform embedding data;
      store the first aggregated embedding data;
      store data indicative of an association between the first aggregated embedding data and the first identification data; and
      remove the input image data from the memory before a second time; and
   at the second time:
      retrieve the first aggregated embedding data;
      determine query input image data;
      determine query embedding data in the first embedding space based on processing the query input image data with a first embedding model;
      compare the query embedding data and the first aggregated embedding data; and
      determine, based on the comparison of the query embedding data and the first aggregated embedding data, that the first identification data is associated with the query input image data.

2. The system of claim 1, the hardware processor to further execute the first computer-executable instructions to:
   determine first embedding data based on processing the input image data with a second embedding model;
   determine second embedding data based on processing the input image data with a third embedding model; and
   wherein the first plurality of embedding data comprises the first embedding data and the second embedding data.

3. The system of claim 1, the hardware processor to further execute the first computer-executable instructions to:
   determine first single transform embedding data based on processing the input image data with a first transformer network that is associated with a second embedding model;
   determine second single transform embedding data based on processing the input image data with a second transformer network that is associated with a third embedding model; and
   wherein the first plurality of single transform embedding data comprises the first single transform embedding data and the second single transform embedding data.

4. A method comprising:
   at a first time:
      accessing image data;
      determining a first plurality of embedding data by processing the image data with each of a first plurality of embedding models;
      determining a first plurality of single transform embedding data by processing the first plurality of embedding data with a first plurality of transformer networks;
      determining first aggregated embedding data based on the first plurality of single transform embedding data;
      storing the first aggregated embedding data;

storing data indicative of an association between the first aggregated embedding data and first identification data; and removing the image data from memory before a second time; and at the second time:

retrieving the first aggregated embedding data;

determining query image data;

determining query embedding data;

comparing the query embedding data and the first aggregated embedding data; and determining that the first identification data is associated with the query image data.

5. The method of claim 4, the first plurality of embedding models comprising:

a first embedding model trained using a first set of training data; and a second embedding model trained using a second set of training data, wherein the first set of training data differs from the second set of training data.

6. The method of claim 4, the determining the first plurality of embedding data comprising:

determining first embedding data using a first embedding model to process the image data; and the determining the first plurality of single transform embedding data comprising:

determining first single transform embedding data using a first transformer network to process the first embedding data; and determining second single transform embedding data using a second transformer network to process the first embedding data.

7. The method of claim 4, the determining the first plurality of embedding data comprising:

determining first embedding data using a first embedding model to process the image data; and determining second embedding data using a second embedding model to process the image data; and the determining the first plurality of single transform embedding data comprising:

determining first single transform embedding data using a first transformer network to process the first embedding data; and determining second single transform embedding data using a second transformer network to process the second embedding data.

8. The method of claim 4, the determining the first plurality of embedding data comprising:

determining first embedding data using a first embedding model to process the image data; and determining second embedding data using a second embedding model to process the image data; and the determining the first plurality of single transform embedding data comprising:

determining first single transform embedding data using a first transformer network to process the first embedding data;

determining second single transform embedding data using a second transformer network to process the first embedding data;

determining first monomodel embedding data based on the first single transform embedding data and the second single transform embedding data;

determining third single transform embedding data using a third transformer network to process the second embedding data;

determining fourth single transform embedding data using a fourth transformer network to process the second embedding data;

determining second monomodel embedding data based on the third single transform embedding data and the fourth single transform embedding data; and wherein the first aggregated embedding data is further based on the first monomodel embedding data and the second monomodel embedding data.

9. The method of claim 4, wherein the determining the first aggregated embedding data comprises one or more of:

determining an average of the first plurality of single transform embedding data, determining a weighted average of the first plurality of single transform embedding data, summing the first plurality of single transform embedding data, or processing the first plurality of single transform embedding data using a machine learning system.

10. The method of claim 4, further comprising:

determining that the first identification data is associated with the image data at the first time.

11. The method of claim 10, wherein:

the query embedding data is determined based on processing the query image data with at least a first embedding model; and the determining that the first identification data is associated with the query image data is based on the comparing the query embedding data and the first aggregated embedding data.

12. The method of claim 10, wherein:

the query embedding data is determined based on processing the query image data with at least a first embedding model; and the method further comprising:

determining at least one single transform embedding data based on processing the query embedding data with at least a first transformer network;

wherein the determining that the first identification data is associated with the query image data is based on the at least one single transform embedding data and the first aggregated embedding data.

13. A system comprising:

a memory, storing first computer-executable instructions; and a hardware processor to execute the first computer-executable instructions to:

at a first time:

access image data;

determine a first plurality of embedding data by processing the image data with each of a first plurality of embedding models;

determine a first plurality of single transform embedding data by processing the first plurality of embedding data with a first plurality of transformer networks;

determine first aggregated embedding data based on the first plurality of single transform embedding data;

store the first aggregated embedding data; and remove the image data from the memory before a second time; and at the second time:

retrieve the first aggregated embedding data;

determine query image data;

determine query embedding data;

compare the query embedding data and the first aggregated embedding data; and determine that first identification data associated with the image data is associated with the query image data.

14. The system of claim 13, the first computer-executable instructions to determine the first plurality of embedding data comprising instructions to:
   determine first embedding data using a first embedding model to process the image data; and
the first computer-executable instructions to determine the first plurality of single transform embedding data comprising instructions to:
   determine first single transform embedding data using a first transformer network to process the first embedding data; and
   determine second single transform embedding data using a second transformer network to process the first embedding data.

15. The system of claim 13, the first computer-executable instructions to determine the first plurality of embedding data comprising instructions to:
   determine first embedding data using a first embedding model to process the image data; and
   determine second embedding data using a second embedding model to process the image data; and
the first computer-executable instructions to determine the first plurality of single transform embedding data comprising instructions to:
   determine first single transform embedding data using a first transformer network to process the first embedding data; and
   determine second single transform embedding data using a second transformer network to process the second embedding data.

16. The system of claim 13, the first computer-executable instructions to determine the first plurality of embedding data comprising instructions to:
   determine first embedding data using a first embedding model to process the image data; and
   determine second embedding data using a second embedding model to process the image data; and
the first computer-executable instructions to determine the first plurality of single transform embedding data comprising instructions to:
   determine first single transform embedding data using a first transformer network to process the first embedding data;
   determine second single transform embedding data using a second transformer network to process the first embedding data;
   determine first monomodel embedding data based on the first single transform embedding data and the second single transform embedding data;
   determine third single transform embedding data using a third transformer network to process the second embedding data;
   determine fourth single transform embedding data using a fourth transformer network to process the second embedding data;
   determine second monomodel embedding data based on the third single transform embedding data and the fourth single transform embedding data; and
   wherein the first aggregated embedding data is further based on the first monomodel embedding data and the second monomodel embedding data.

17. The system of claim 13, the first computer-executable instructions to determine the first aggregated embedding data comprising instructions to one or more of:
   determine an average of the first plurality of single transform embedding data,
   determine a weighted average of the first plurality of single transform embedding data,
   determine a sum of the first plurality of single transform embedding data, or
   process the first plurality of single transform embedding data using a machine learning system.

18. The system of claim 13, the hardware processor to further execute the first computer-executable instructions to:
   determine the first identification data that is associated with the image data at the first time; and
   store data indicative of an association between the first aggregated embedding data and the first identification data at the first time.

19. The system of claim 13, wherein:
   the query embedding data is determined based on processing the query image data with at least a first embedding model; and
   the determination that the first identification data is associated with the query image data is based on the query embedding data and the first aggregated embedding data.

20. The system of claim 13, the hardware processor to further execute the first computer-executable instructions to:
   receive, from a second system, a first embedding model that has been trained; and
   wherein the first plurality of embedding models comprises the first embedding model.

* * * * *